(12) United States Patent
Tsai

(10) Patent No.: US 10,275,134 B1
(45) Date of Patent: Apr. 30, 2019

(54) REVERSING REFERENCE LINE ADJUSTMENT SYSTEM FOR REVERSING IMAGE DISPLAY AND METHOD THEREOF

(71) Applicants: FORTRESS AUTO INT'L LTD., Taoyuan (TW); INVENTEC BESTA CO., LTD., Taipei (TW)

(72) Inventor: Kuo-Hui Tsai, Taoyuan (TW)

(73) Assignees: FORTRESS AUTO INT'L LTD., Taoyuan (TW); INVENTEC BESTA CO., LTD., Taipei (TW)

( * ) Notice: Subject to any disclaimer, the term of this patent is extended or adjusted under 35 U.S.C. 154(b) by 0 days.

(21) Appl. No.: 15/872,965

(22) Filed: Jan. 16, 2018

(51) Int. Cl.
| | |
|---|---|
| G06F 3/0488 | (2013.01) |
| G06F 3/0484 | (2013.01) |
| H04N 5/232 | (2006.01) |
| H04N 7/18 | (2006.01) |
| B60R 1/00 | (2006.01) |

(52) U.S. Cl.
CPC ............ G06F 3/04845 (2013.01); B60R 1/00 (2013.01); G06F 3/0488 (2013.01); G06F 3/04842 (2013.01); H04N 5/23293 (2013.01); H04N 7/183 (2013.01); B60R 2300/207 (2013.01); B60R 2300/302 (2013.01); B60R 2300/802 (2013.01)

(58) Field of Classification Search
CPC ............ G06F 3/04845; G06F 3/04842; G06F 3/0488; B60R 1/00; H04N 5/23293; H04N 7/183
USPC ........................................................ 348/148
See application file for complete search history.

(56) References Cited

U.S. PATENT DOCUMENTS

2014/0267688 A1* 9/2014 Aich .................. H04N 7/181
                                                        348/113

\* cited by examiner

*Primary Examiner* — Nguyen T Truong
(74) *Attorney, Agent, or Firm* — Chih Fenf Yeh; Huntington IP Consulting Co., Ltd.

(57) ABSTRACT

The present disclosure illustrates a reversing reference line adjustment system for reversing image display and method thereof. In an embodiment, the reversing reference line adjustment system may adjust a display position of a set of reversing reference lines, a display position of a horizontal reversing reference line, a display position of a front point of a left reversing reference line, a display position of a rear point of the left reversing reference line, a display position of a front point of a right reversing reference line, or a display position of a rear point of the right reversing reference line on a reversing image, according to an adjustment instruction.

10 Claims, 14 Drawing Sheets

REVERSING REFERENCE LINE ADJUSTMENT SYSTEM FOR REVERSING IMAGE DISPLAY AND METHOD THEREOF

BACKGROUND

1. Technical Field

The present disclosure relates to an adjustment system and method thereof, more particularly to a reversing reference line adjustment system for reversing image display and method thereof.

2. Description of Related Arts

Existing reversing image display system displays a reversing image to assist a driver in reversing vehicle; furthermore, a reversing reference line is generally overlaid on the reversing image to provide more assistance to the driver in reversing vehicle, so that the driver may watch the reversing reference line to obtain a reversing distance to an obstruction.

Generally, the existing reversing image display system is unable to provide the driver to adjust the reversing reference line, such as a position of the reversing reference line. That is, the existing reversing image display system is dedicated for particular vehicle and does not provide the driver with the function of adjusting the reversing reference line.

For this reason, the existing reversing image display system is unable to satisfy different drivers' demands, for example, some drivers may want to not get too close to rear vehicle while reversing the vehicle, or some drivers may want to not get too close to a wall while reversing the vehicle. There is still much room for improvement in the existing reversing image display system.

Besides the different drivers' demands in different reversing reference lines, it also requires different reversing reference lines for different places, for example, the demands for parking in the underground parking lot of company and the parking lot for home are different, so that an adjustable reversing reference line is more helpful for the driver in reversing vehicle at various parking lots. However, existing reversing image display system does not provide the driver with the function of adjusting reversing reference line.

Therefore, what is need is to develop a reversing image display system with the function of adjusting the reversing reference line, thereby solving the problem of the existing reversing image display system.

SUMMARY

In order to solve the problem that the reversing image display system does not have the function of adjusting the reversing reference line, the present disclosure is to provide a reversing reference line adjustment system for reversing image display and method thereof.

The reversing reference line adjustment system includes an image device and an electronic device. The image device is mounted at the rear of a vehicle, and includes an image capture module and a first wireless transmission module. The electronic device receives a reversing image from the first wireless transmission module, and includes a touch-controlled display module and an adjustment module.

The image capture module is activated to capture the reversing image while the vehicle is reversing, and the first wireless transmission module is configured to receive the reversing image from the image capture module, and transmit the reversing image by a wireless transmission manner.

The touch-controlled display module is configured to display the reversing image and a set of reversing reference lines on the reversing image. The set of reversing reference lines includes a horizontal reversing reference line, a left reversing reference line and a right reversing reference line. The touch-controlled display module receives an adjustment instruction inputted by a driver. The adjustment module is configured to receive the adjustment instruction from the touch-controlled display module and adjust a display position of the set of reversing reference lines, a display position of the horizontal reversing reference line, a display position of a front point of the left reversing reference line, a display position of a rear point of the left reversing reference line, a display position of a front point of the right reversing reference line or a display position of a rear point of the right reversing reference line on the reversing image, according to the adjustment instruction.

In order to solve aforementioned problem, the present disclosure further provides a reversing reference line adjustment method for reversing image display. The method includes following steps: providing an image device which includes an image capture module and a first wireless transmission module, and mounting the image device at the rear of a vehicle; activating the image capture module to obtain a reversing image while the vehicle is reversing; receiving, by the first wireless transmission module, the reversing image from the image capture module, and transmitting the reversing image to an electronic device, which includes a touch-controlled display module and an adjustment module, by a wireless transmission manner; displaying the reversing image on the touch-controlled display module, and displaying a set of reversing reference lines, which includes a horizontal reversing reference line, a left reversing reference line and a right reversing reference line, on the reversing image; receiving, by the touch-controlled display module, an adjustment instruction inputted by a driver; receiving, by the adjustment module, the adjustment instruction from the touch-controlled display module, and adjusting a display position of the set of reversing reference lines, a display position of the horizontal reversing reference line, a display position of a front point of the left reversing reference line, a display position of a rear point of the left reversing reference line, a display position of a front point of the right reversing reference line, or a display position of a rear point of the right reversing reference line on the reversing image, according to the adjustment instruction.

To summarize, the difference between the conventional technology and the present disclosure is that the adjustment system of the present disclosure is able to adjust the display position of the set of reversing reference lines, the display position of the horizontal reversing reference line, the display position of the front point of the left reversing reference line, the display position of the rear point of the left reversing reference line, the display position of the front point of the right reversing reference line, or the display position of the rear point of the right reversing reference line on the reversing image, according to the adjustment instruction.

By aforementioned technology means, the present disclosure may achieve a technical effect of adjusting the reversing reference line shown by the reversing image display system.

BRIEF DESCRIPTION OF THE DRAWINGS

The structure, operating principle and effects of the present disclosure will be described in detail by way of various embodiments which are illustrated in the accompanying drawings.

DETAILED DESCRIPTION

Figure 1:
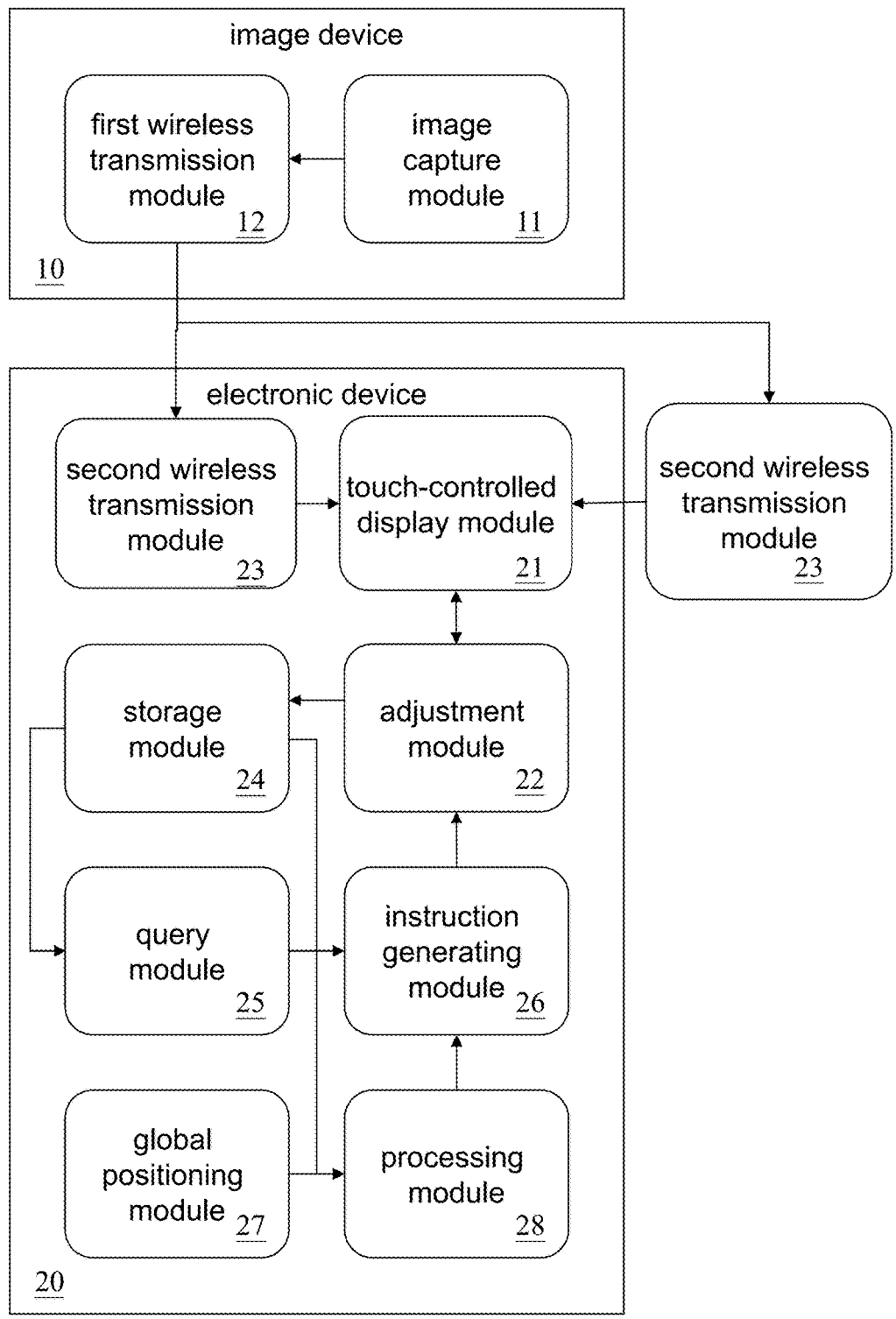
FIG. 1 is a system block diagram of a reversing reference line adjustment system for reversing image display, in accordance with the present disclosure.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

The following refers to FIG. 1 for illustration of the reversing reference line adjustment system for reversing image display, in accordance with the present disclosure. FIG. 1 is a system block diagram of the reversing reference line adjustment system of the present disclosure.

The reversing reference line adjustment system includes an image device 10 and an electronic device 20. The image device 10 includes an image capture module 11 and a first wireless transmission module 12. The electronic device 20 includes a touch-controlled display module 21 and an adjustment module 22.

The image device 10 is mounted at the rear of a vehicle, for example, the image device 10 is mounted in a license plate at the rear of the vehicle by a screwing manner, or mounted in a bumper at the rear of the vehicle by an embedding manner; but these examples are merely for exemplary illustration, and the application field of the present disclosure is not limited thereto.

The image capture module 11 of the image device 10 is configured to capture a reversing image while the vehicle is reversing. The first wireless transmission module 12 of the image device 10 receives the reversing image from the image capture module 11, and then transmits the reversing image to the electronic device 20 by a wireless transmission manner.

The electronic device 20 may be a vehicle mounted device, a handheld device, a smart device and so on; these examples are merely for exemplary illustration and the application field of the present disclosure is not limited thereto. The vehicle mounted device is referred to as a device mounted in the vehicle; the handheld device may be a smartphone, a personal digital assistant (PDA), and so on; the smart device may be a tablet computer, a notebook computer and so on.

The electronic device 20 receives the reversing image from the first wireless transmission module 12 of the image device 10 through a second wireless transmission module 23 by the wireless transmission manner. The second wireless transmission module 23 may be embedded in the electronic device 20 or plugged in the electronic device 20. After the electronic device 20 receives the reversing image from the first wireless transmission module 12 of the image device 10, the touch-controlled display module 21 of the electronic device 20 may display the reversing image, and a set of reversing reference lines on the reversing image. The set of reversing reference lines includes a horizontal reversing reference line, a left reversing reference line, and a right reversing reference line, and these reference lines are overlaid on the reversing image for assist a driver in reversing the vehicle.

It is worth noting that the wireless transmission manner used between the first wireless transmission module 12 and the second wireless transmission module 23 includes Wi-Fi, Bluetooth, and ZigBee and so on; but these examples are merely for exemplary illustration, and the application field of the present disclosure is not limited thereto.

After the touch-controlled display module 21 of the electronic device 20 displays the reversing image and the set of reversing reference lines, the driver may adjust the set of reversing reference lines shown on the touch-controlled display module 21 of the electronic device 20 upon personal demand, and an adjustment instruction is generated correspondingly to the driver's adjustment.

According to the adjustment instruction, the adjustment module 22 of the electronic device 20 adjusts a display position of the set of reversing reference lines on the reversing image, a display position of the horizontal reversing reference line on the reversing image, a display position of a front point of the left reversing reference line on the reversing image, a display position of a rear point of the left reversing reference line on the reversing image, a display position of a front point of the right reversing reference line on the reversing image, or a display position of a rear point of the right reversing reference line on the reversing image.

The electronic device 20 further includes a storage module 24, a query module 25, an instruction generating module 26, a global positioning module 27 and a processing module 28. The storage module 24 of the electronic device 20 is configured to store at least one piece of setting data of the set of reversing reference lines, and each piece of setting data of the set of reversing reference lines includes a record name and a position of the set of reversing reference lines displayed on the reversing image. The stored record name may be "company", "home", "hometown", "in-laws' home", "record 1", "record 2", "A1", "C5" and so on; however, these examples are merely for exemplary illustration and the application field of the present disclosure is not limited thereto.

The adjustment system of the present disclosure further provides the driver to quickly select the display position of the set of reversing reference lines on the reversing image. The touch-controlled display module 21 of the electronic device 20 may display the record names in all pieces of the setting data of the set of reversing reference lines stored in the storage module 24 of the electronic device 20, and the driver may select one of the record names displayed on the touch-controlled display module 21 of the electronic device 20.

After the driver selects one of the record names displayed on the touch-controlled display module 21 of the electronic device 20, the query module 25 of the electronic device 20 receives the selected record name from the touch-controlled display module 21 of the electronic device 20, and then searches the display position of the set of reversing reference lines corresponding to the selected record name.

After the query module 25 of the electronic device 20 searches the corresponding display position of the set of reversing reference lines to be displayed on the reversing image, the instruction generating module 26 of the electronic device 20 generates an adjustment instruction according to the searched corresponding display position of the set of reversing reference lines, and transmits the adjustment instruction to the adjustment module 22 of the electronic device 20 for sequential adjustment of the set of reversing reference lines.

Besides the record name and the display position of the set of reversing reference lines on the reversing image, each piece of setting data of the set of reversing reference lines stored in the storage module 24 of the electronic device 20 further includes a global position coordinate range.

The global positioning module 27 of the electronic device 20 is configured to obtain a global positioning coordinate of the vehicle, and the processing module 28 of the electronic device 20 receives the global positioning coordinate from the global positioning module 27 of the electronic device 20 and determines whether the global positioning coordinate of the vehicle is within one of the global positioning coordinate range according to the global positioning coordinate range of the at least one piece of setting data of the set of reversing reference lines stored in the storage module 24 of the electronic device 20.

After the processing module 28 of the electronic device 20 determines that the global positioning coordinate of the vehicle is within one of the global positioning coordinate range of the at least one piece of setting data of the set of reversing reference lines, the processing module 28 searches the display position of the set of reversing reference lines corresponding to the global positioning coordinate range which the global positioning coordinate of the vehicle is within, and the instruction generating module 26 of the electronic device 20 then generates the adjustment instruction according to the searched display position and transmits the adjustment instruction to the adjustment module 22 of the electronic device 20 for sequential adjustment of the set of reversing reference lines. As a result, the adjustment system of the present disclosure is able to automatically select the display position of the set of reversing reference lines on the reversing image meeting the driver's demand according to the global positioning coordinate of the vehicle.

Figure 2:
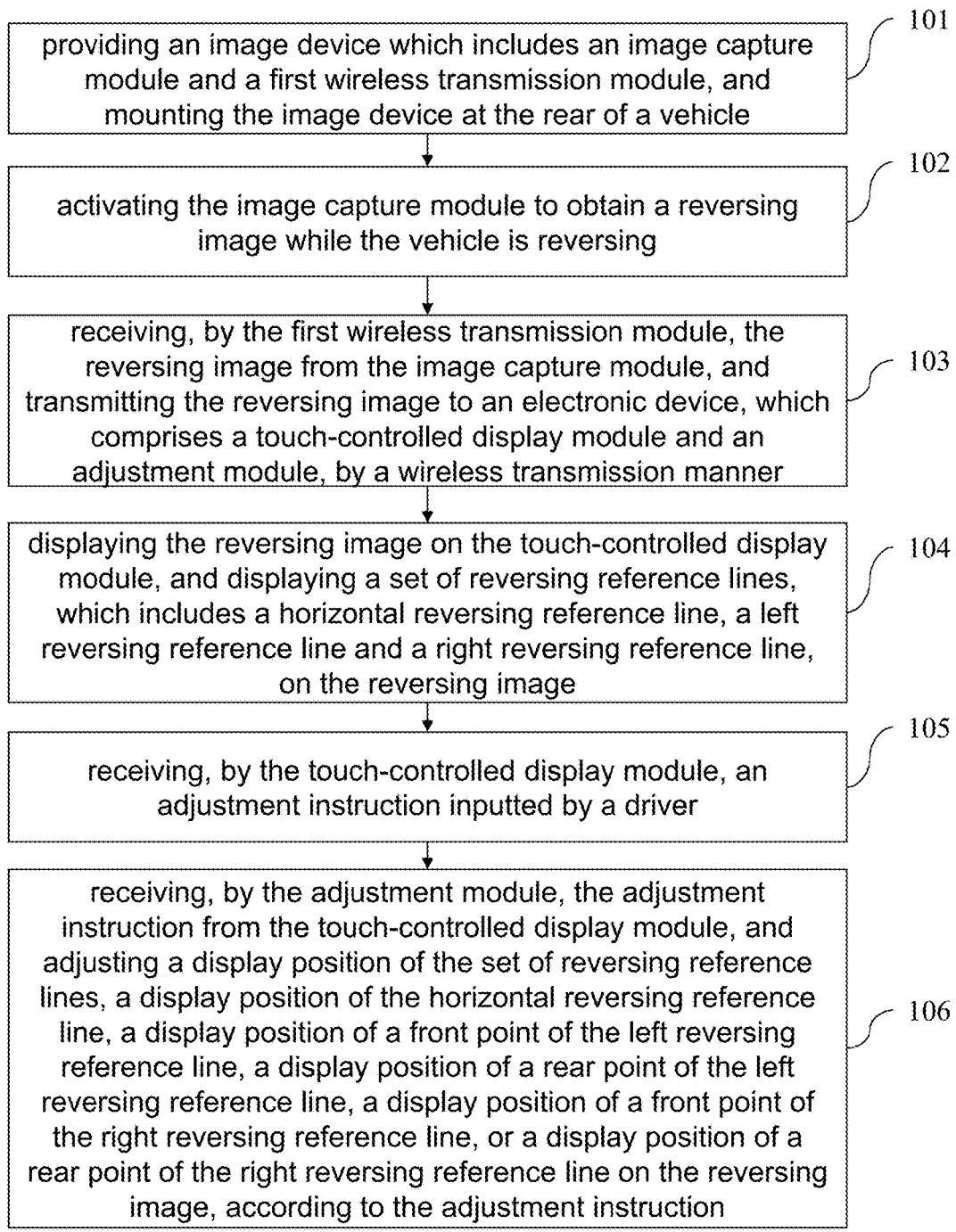
FIG. 2 is a flowchart of a reversing reference line adjustment method for reversing image display, in accordance with the present disclosure.

The following refers to FIGS. 1 and 2 to describe a first embodiment for illustration of a first aspect of the present disclosure. FIG. 2 is a flowchart showing the steps in an adjustment operation of the reversing reference line adjustment method for reversing image display, in accordance with the present disclosure.

In a step 101, the image device 10 is mounted at the rear of the vehicle, and the image device 10 includes the image capture module 11 and the first wireless transmission module 12. For example, the image device 10 may be mounted in a license plate at the rear of the vehicle by a screwing manner, or mounted in a bumper at the rear of the vehicle by an embedding manner; but these examples are merely for exemplary illustration, and the application field of the present disclosure is not limited thereto.

In a step 102, the image capture module 11 of the image device 10 is used to capture the reversing image while the vehicle is reversing. In a step 103, after the first wireless transmission module 12 of the image device 10 receives the reversing image from the image capture module 11 of the image device 10, the first wireless transmission module 12 transmits the reversing image to the electronic device 20 by the wireless transmission manner.

The electronic device 20 may be a vehicle mounted device, a handheld device, a smart device and so on; these examples are merely for exemplary illustration and the application field of the present disclosure is not limited thereto. The vehicle mounted device is referred to as a device mounted in the vehicle; the handheld device may be a smartphone, a personal digital assistant (PDA), and so on; the smart device may be a tablet computer, a notebook computer and so on. The electronic device 20 includes the touch-controlled display module 21 and the adjustment module 22.

Figure 3:
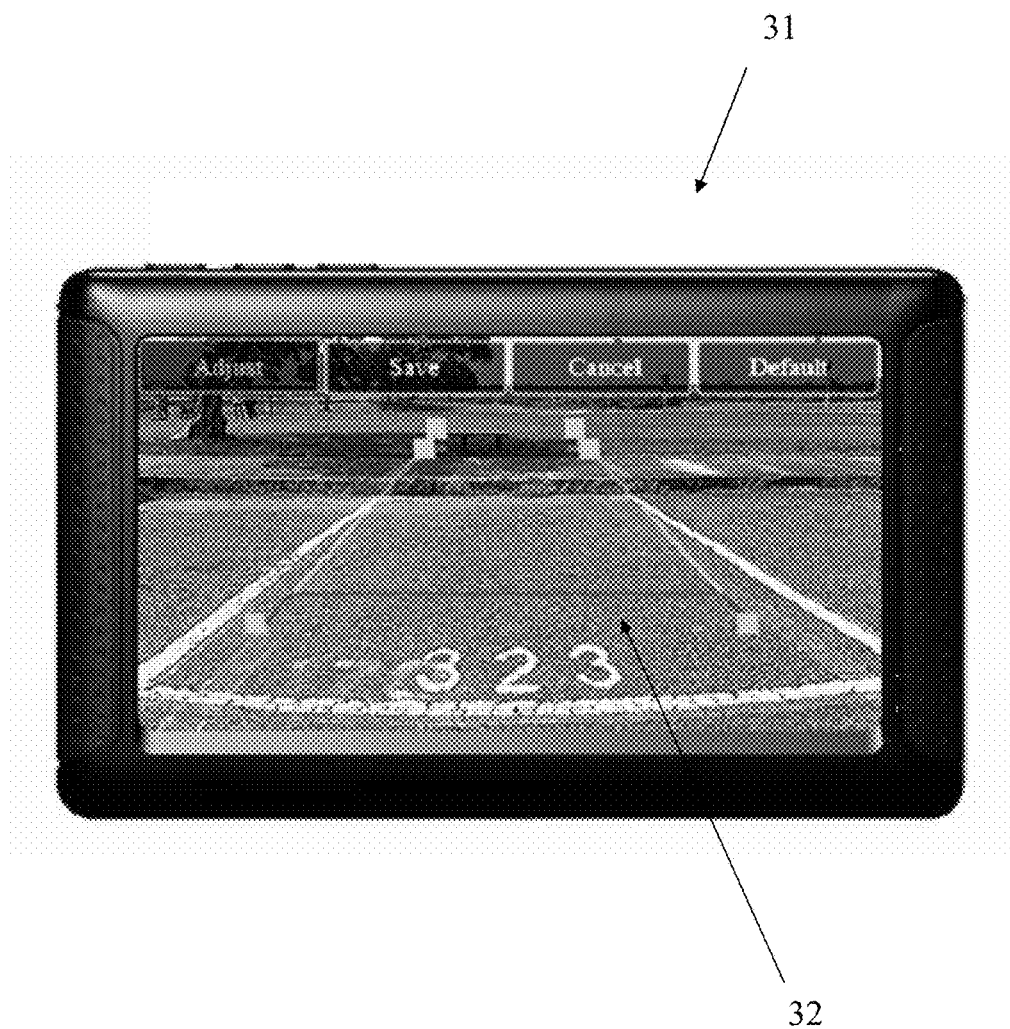
FIG. 3 is a schematic view of a reversing image and a set of reversing reference lines of the reversing reference line adjustment system of the present disclosure.

The electronic device 20 receives the reversing image from the first wireless transmission module 12 of the image device 10 through a second wireless transmission module 23 by the wireless transmission manner. The second wireless transmission module 23 may be embedded in the electronic device 20 or plugged in the electronic device 20. In a step 104, after the electronic device 20 receives the reversing image from the first wireless transmission module 12 of the image device 10, the touch-controlled display module 21 of the electronic device 20 displays the reversing image 31, and the set of reversing reference lines 32 on the reversing image 31. The set of reversing reference lines 32 includes the horizontal reversing reference line, the left reversing reference line, and the right reversing reference line, and these reversing reference lines are overlaid on the reversing image to assist the driver in reversing the vehicle, as shown in FIG. 3, which is a schematic view of the reversing image and the set of reversing reference lines of the reversing reference line adjustment system of the present disclosure.

It is worth noting that the wireless transmission manner used between the first wireless transmission module 12 and the second wireless transmission module 23 is Wi-Fi, Bluetooth, and ZigBee and so on; but these examples are merely for exemplary illustration, and the application field of the present disclosure is not limited thereto.

In a step 105, after the touch-controlled display module 21 of the electronic device 20 displays the reversing image 31 and the set of reversing reference lines 32, the driver may adjust the set of reversing reference lines 32 displayed on the touch-controlled display module 21 of the electronic device 20 upon personal demand, and the adjustment instruction is generated correspondingly to the driver's adjustment.

Figure 4A:
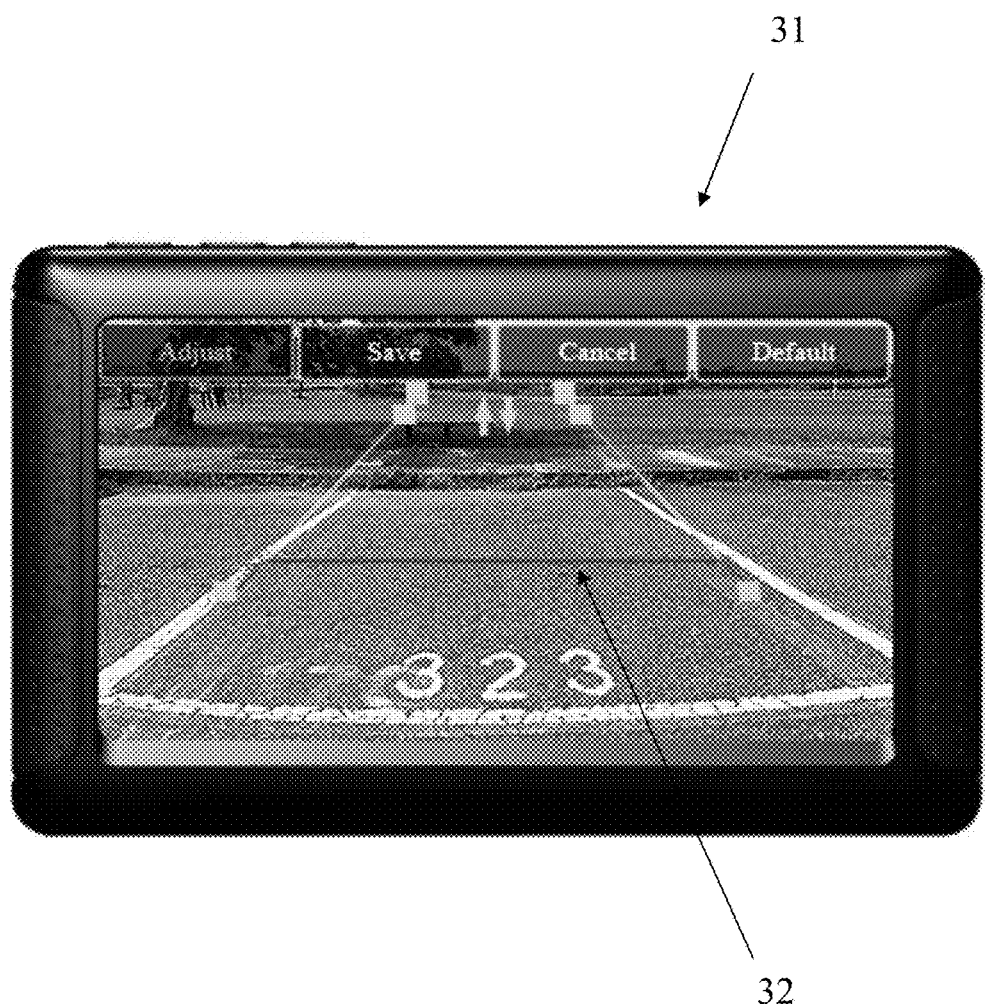
FIGS. 4A and 4B are schematic views of an adjustment process operated in the reversing reference line adjustment system of first embodiment of the present disclosure.
Figure 4B:

The adjustment module 22 of the electronic device 20 is used to adjust the display position of the set of reversing reference lines 32 on the reversing image 31 according to the adjustment instruction, as shown in FIGS. 4A and 4B, which are schematic views of an adjustment process operated in the reversing reference line adjustment system of first embodiment of the present disclosure.

Figure 5:
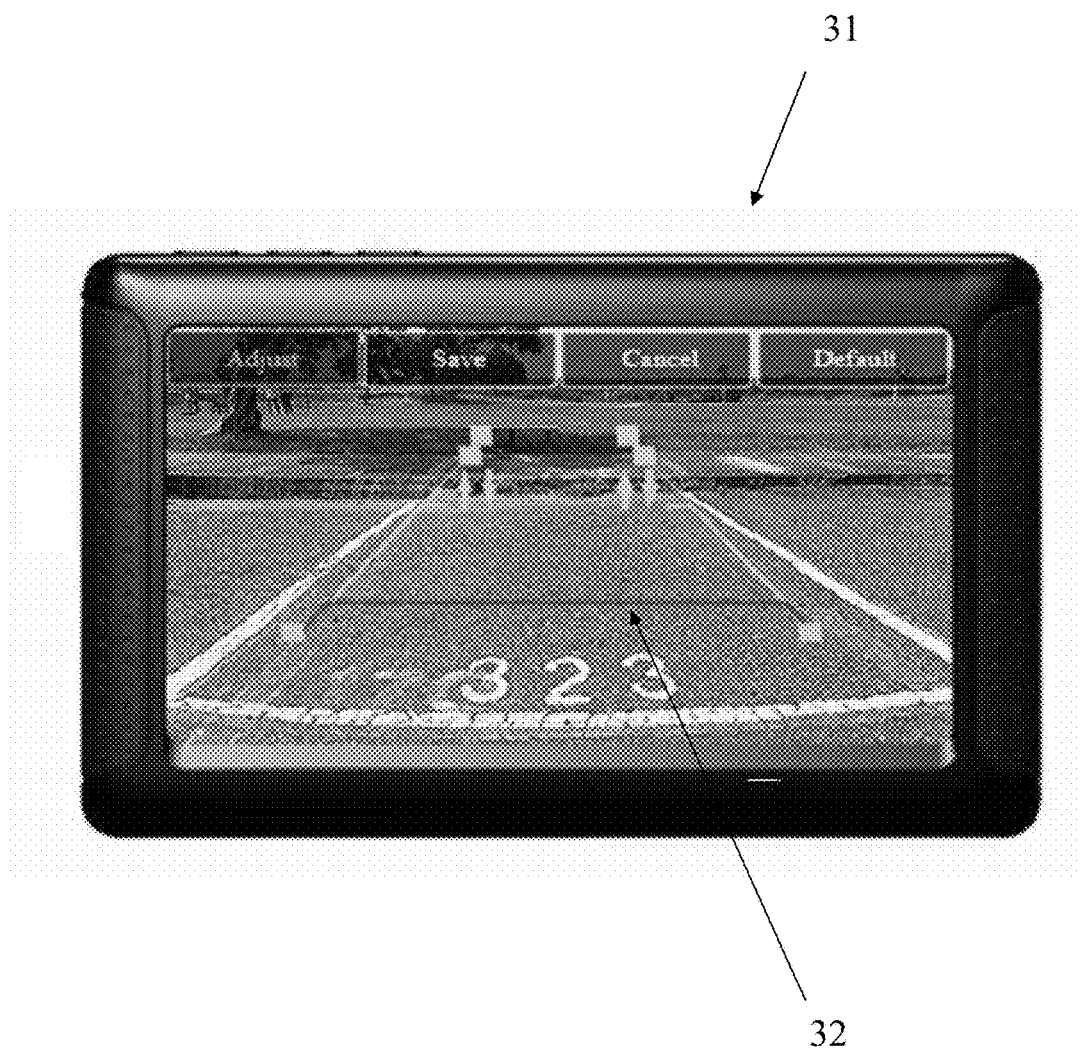
FIG. 5 is a schematic view of an adjustment process operated in the reversing reference line adjustment system of second embodiment of the present disclosure.

In a step 106, the adjustment module 22 of the electronic device 20 may adjust the display position of the horizontal reversing reference line on the reversing image 31 according to the adjustment instruction, as shown in FIG. 5, which is a schematic view of an adjustment process operated in the reversing reference line adjustment system of second embodiment of the present disclosure.

Figure 6A:
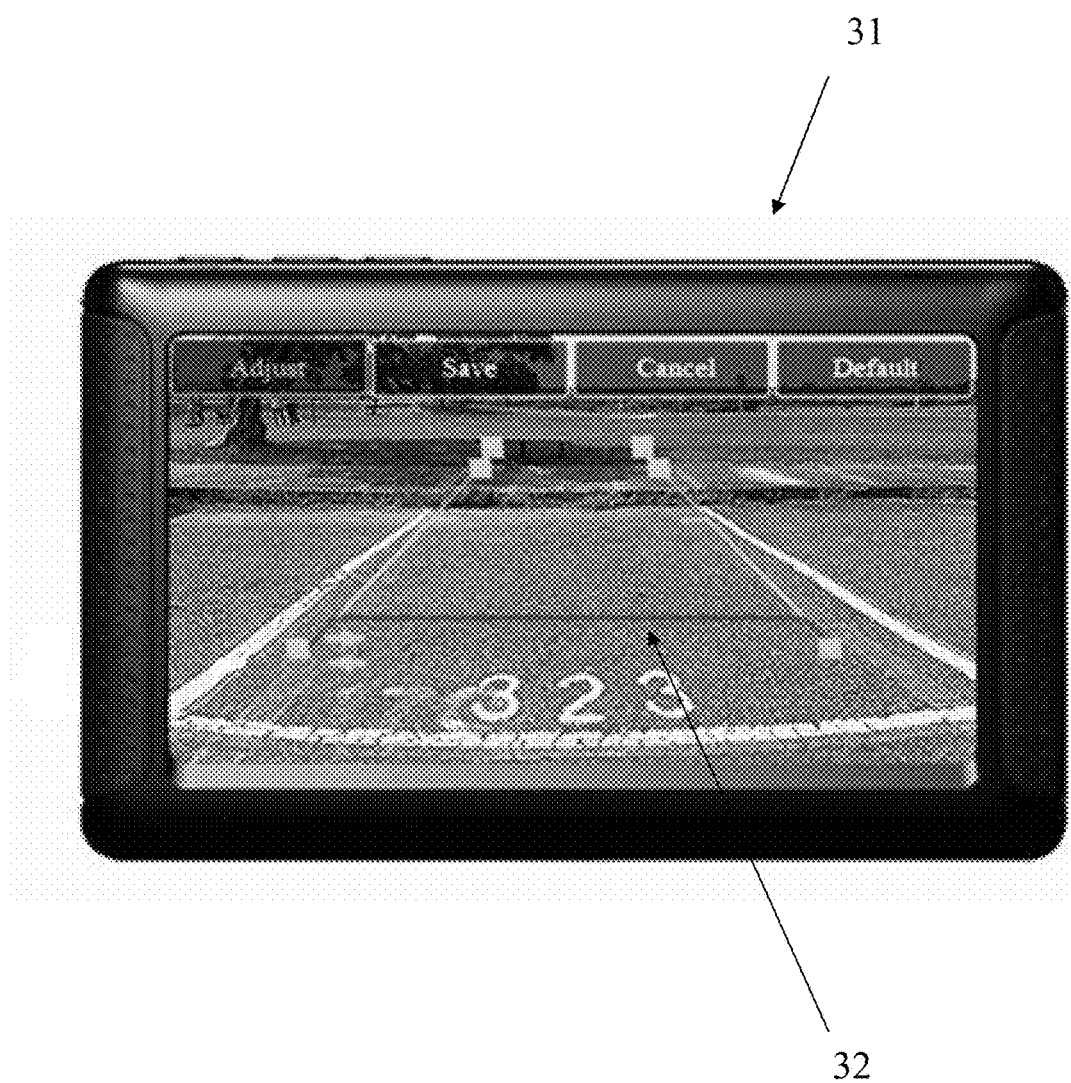
FIGS. 6A and 6B are schematic views of an adjustment process operated in the reversing reference line adjustment system of third embodiment of the present disclosure.
Figure 6B:
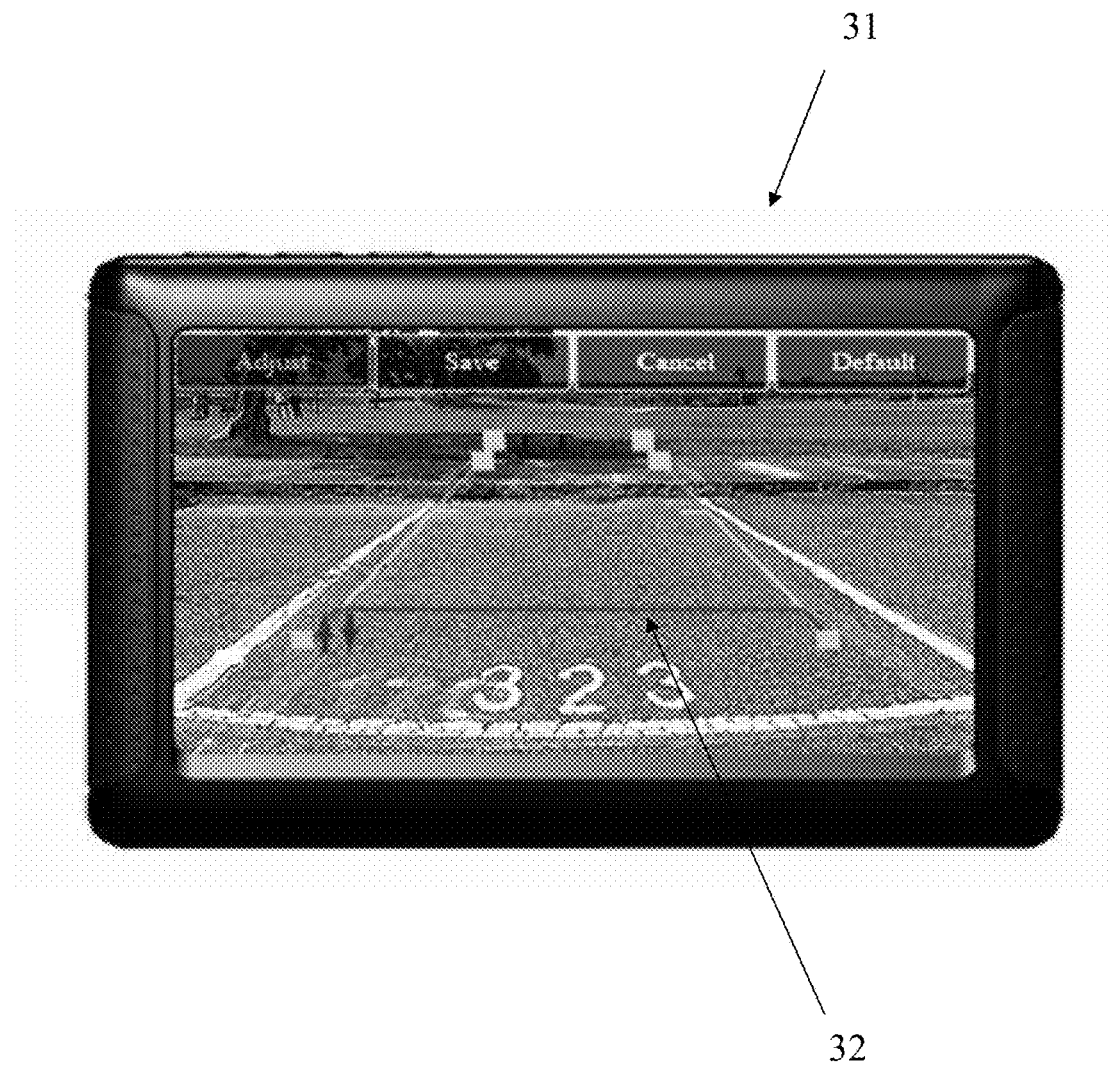

In the step 106, the adjustment module 22 of the electronic device 20 may adjust the display position of the front point of the left reversing reference line on the reversing image 31 according to the adjustment instruction, as shown in FIGS. 6A and 6B, which are schematic views of an adjustment process operated in the reversing reference line adjustment system of third embodiment of the present disclosure.

Figure 7A:
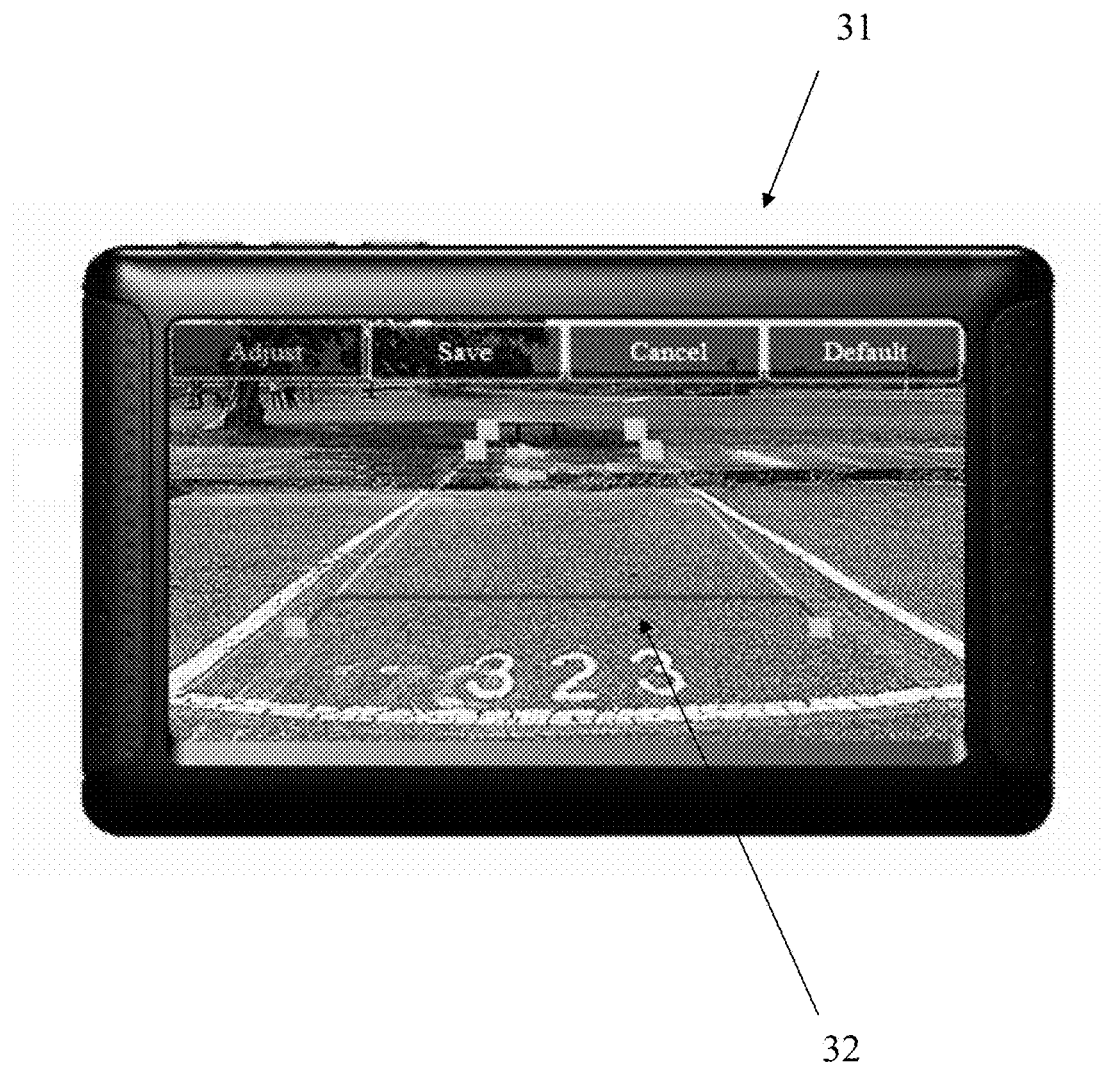
FIGS. 7A and 7B are schematic views of an adjustment process operated in the reversing reference line adjustment system of fourth embodiment of the present disclosure.
Figure 7B:
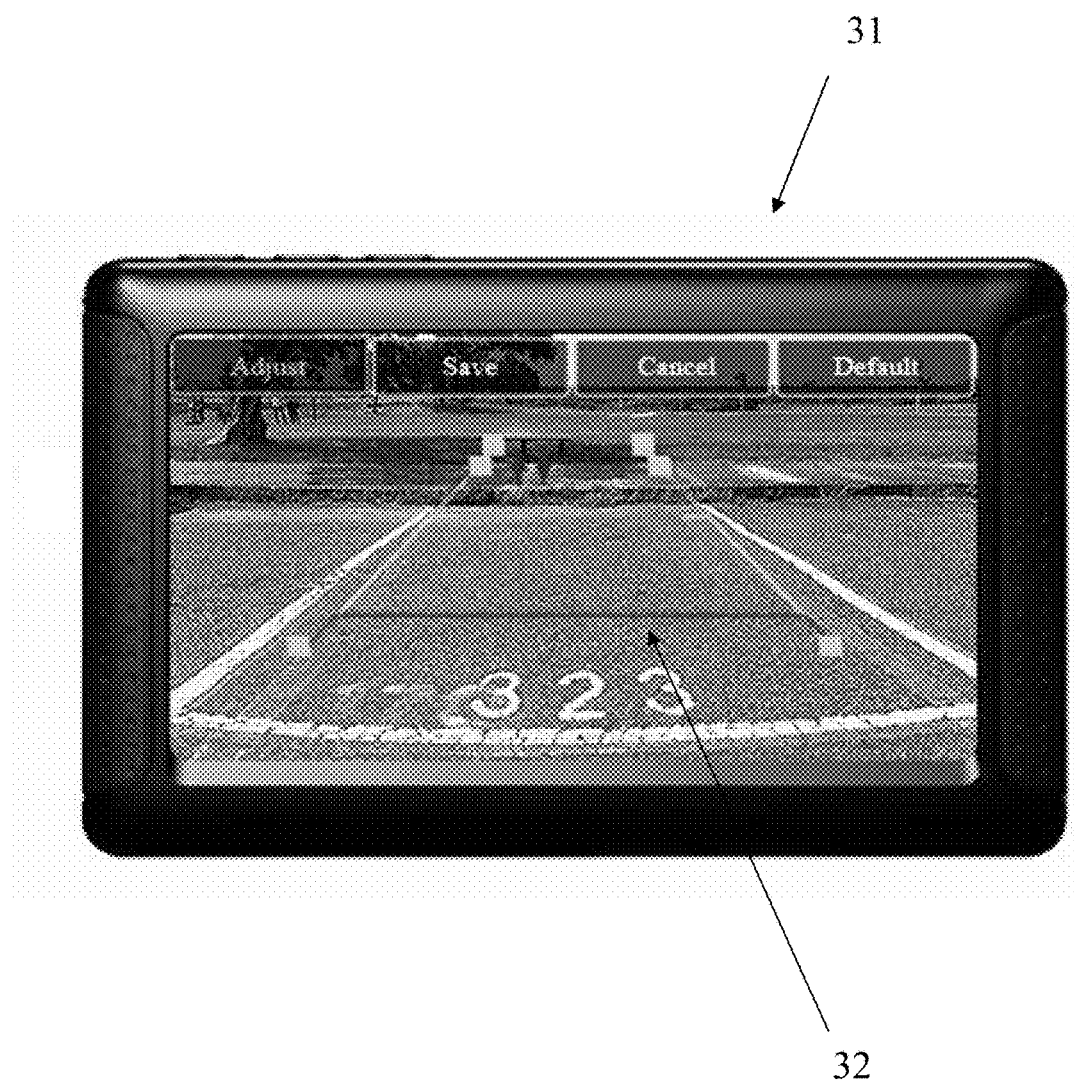

In the step 106, the adjustment module 22 of the electronic device 20 may adjust the display position of the rear point of the left reversing reference line on the reversing image 31 according to the adjustment instruction, as shown in FIGS. 7A and 7B, which are schematic views of an adjustment process operated in the reversing reference line adjustment system of fourth embodiment of the present disclosure.

Figure 8A:
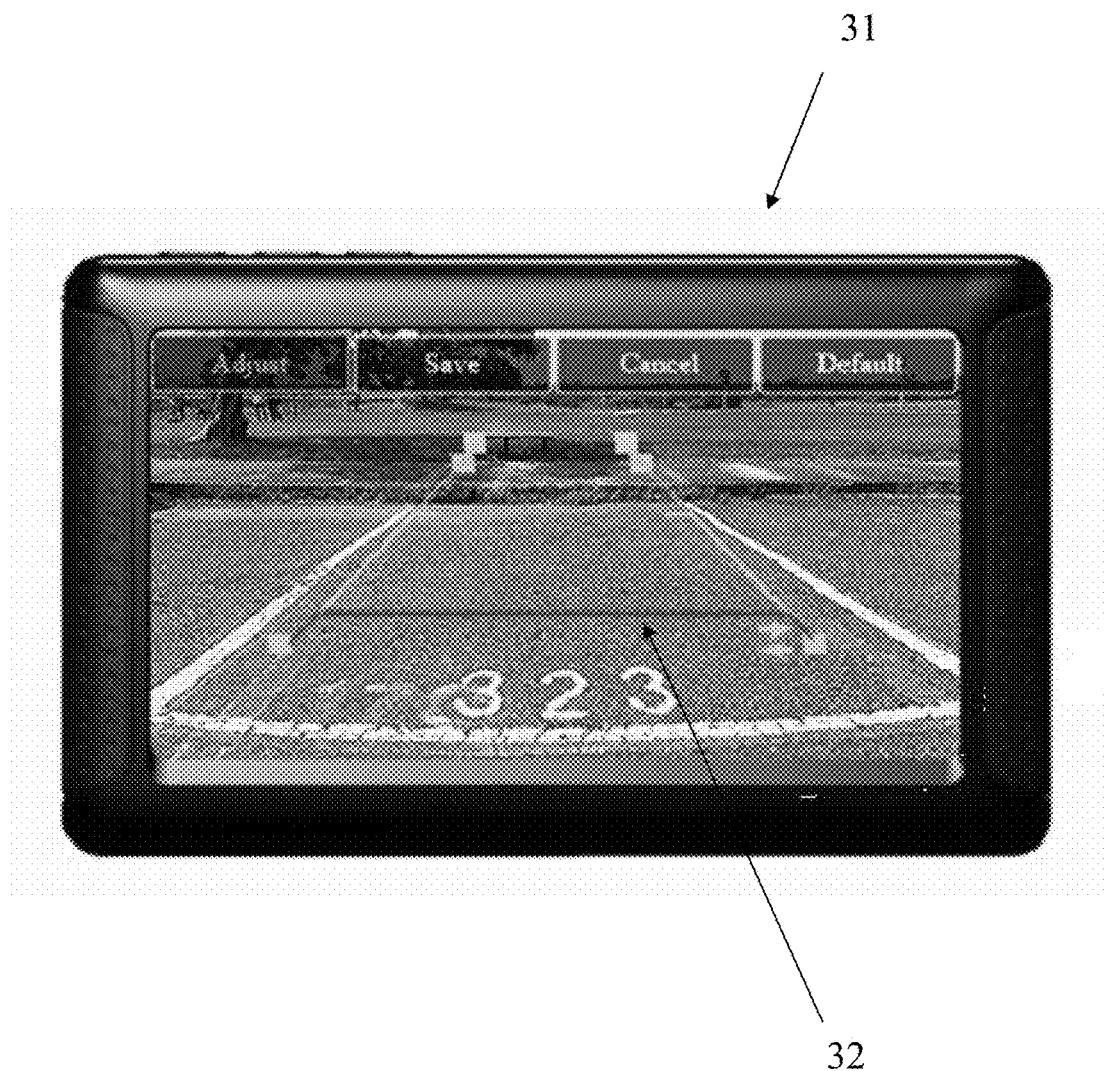
FIGS. 8A and 8B are schematic views of an adjustment process operated in the reversing reference line adjustment system of fifth embodiment of the present disclosure.
Figure 8B:
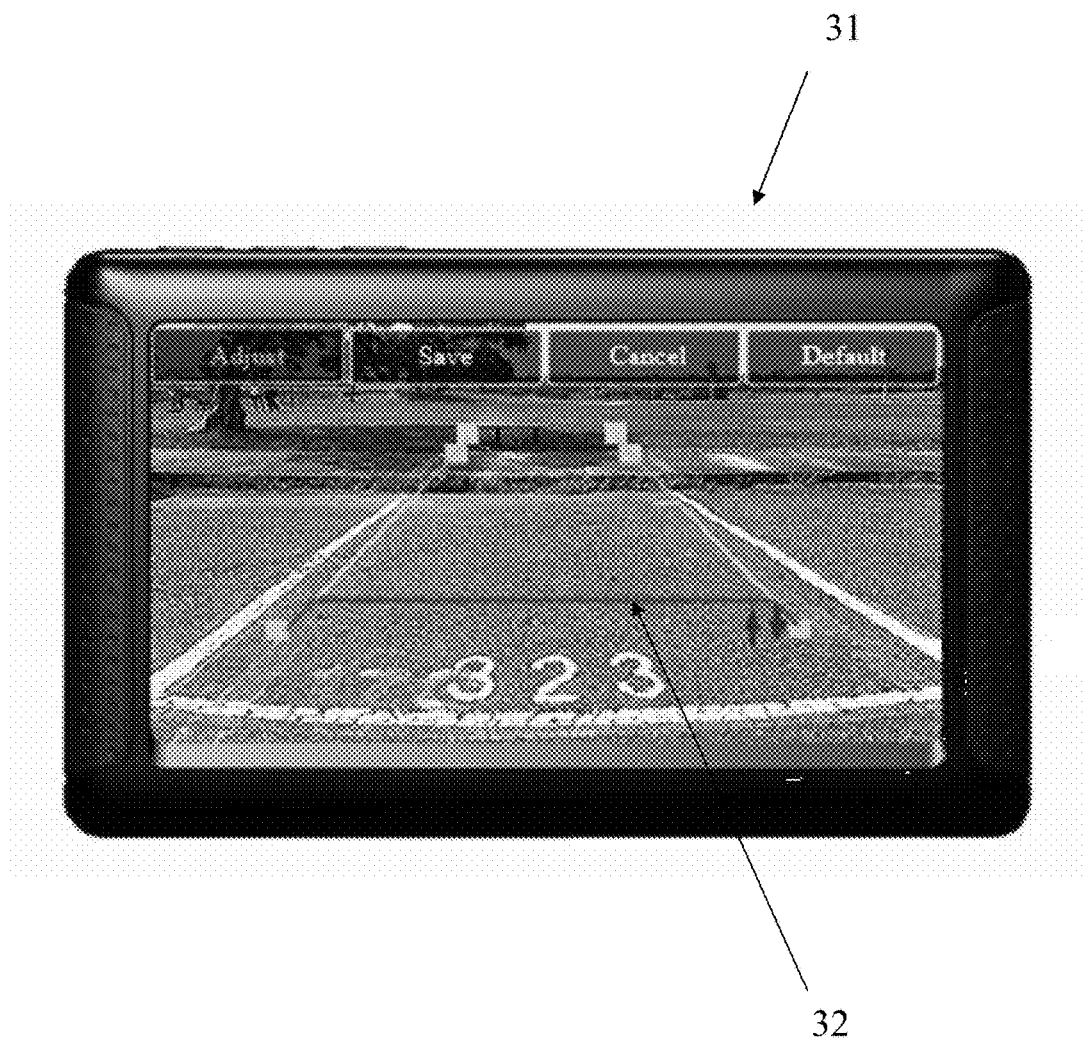

In the step 106, the adjustment module 22 of the electronic device 20 may adjust the display position of the front point of the right reversing reference line on the reversing image 31 according to the adjustment instruction, as shown in FIGS. 8A and 8B, which are schematic views of an adjustment process operated in the reversing reference line adjustment system of fifth embodiment of the present disclosure.

Figure 9A:
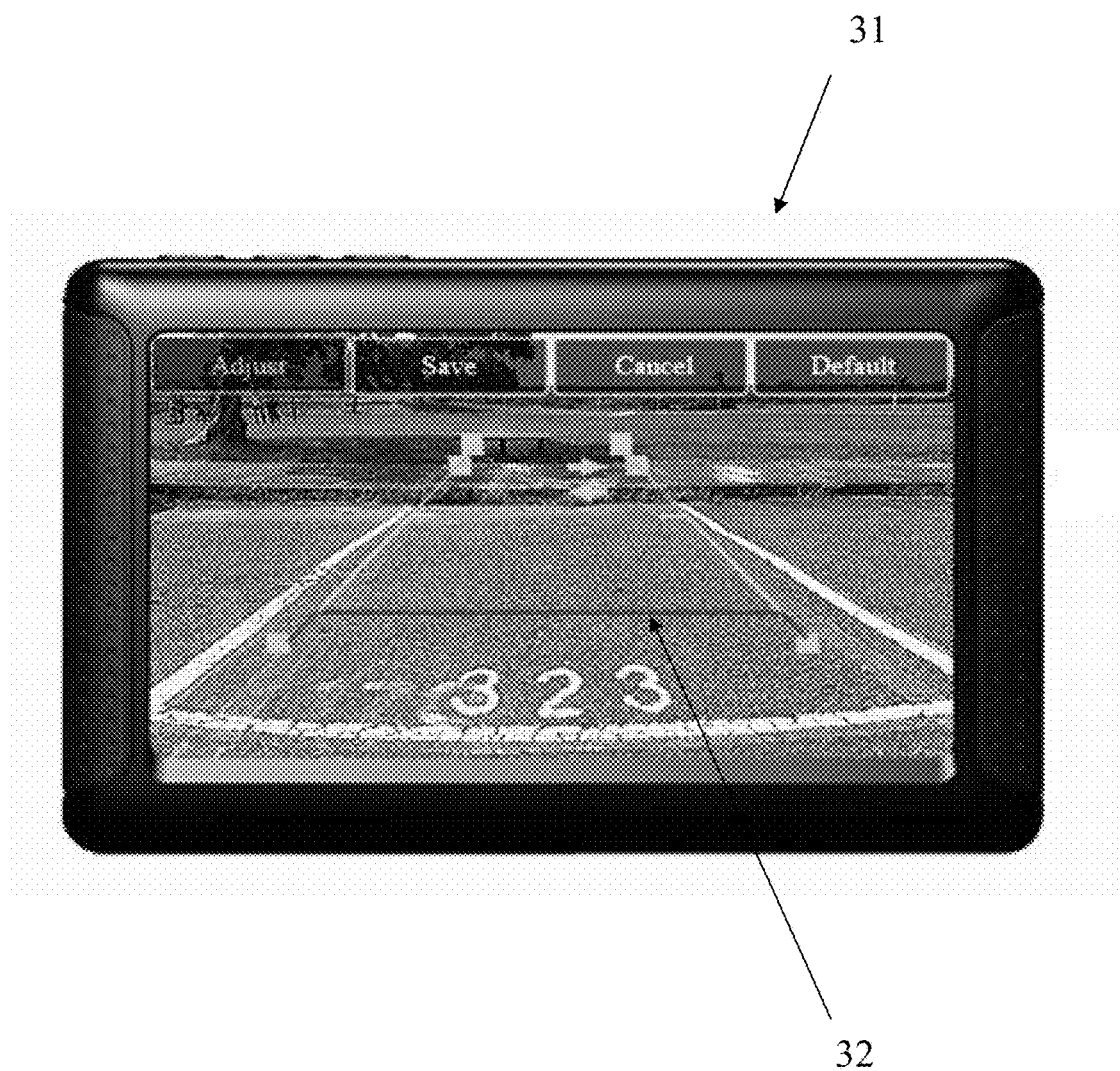
FIGS. 9A and 9B are schematic views of an adjustment process operated in the reversing reference line adjustment system of sixth embodiment of the present disclosure.
Figure 9B:
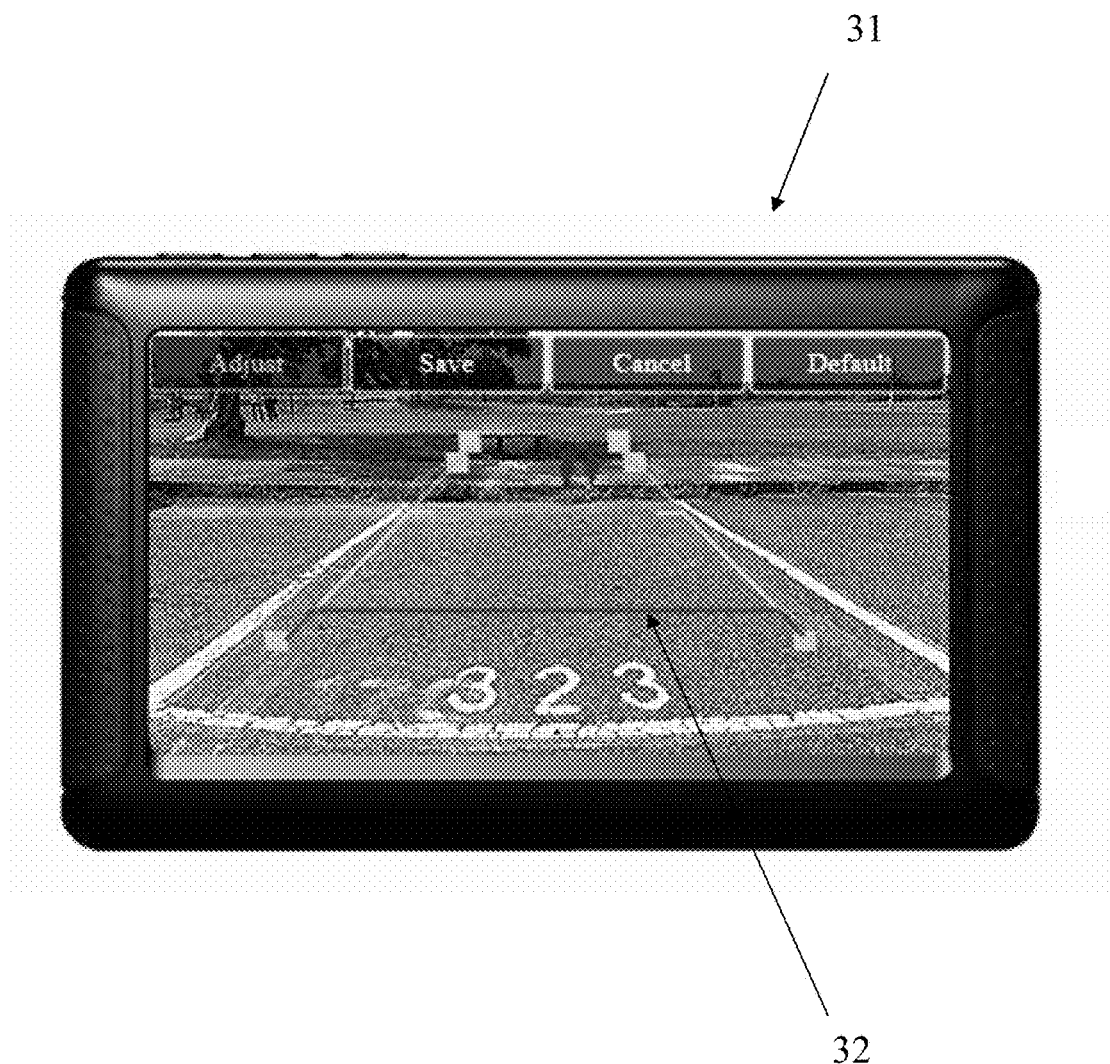

In the step 106, the adjustment module 22 of the electronic device 20 may adjust the display position of the rear point of the right reversing reference line on the reversing image 31 according to the adjustment instruction, as shown in FIGS. 9A and 9B, which are schematic views of an adjustment process operated in the reversing reference line adjustment system of sixth embodiment of the present disclosure.

The electronic device 20 further includes the storage module 24, the query module 25, the instruction generating module 26, the global positioning module 27 and the processing module 28. The storage module 24 of the electronic device 20 is configured to store at least one piece of setting data of the set of reversing reference lines, and each piece of setting data of the set of reversing reference lines includes the record name and the display position of the set of reversing reference lines on the reversing image. The stored record name may be "company", "home", "hometown", "in-laws' home", "record 1", "record 2", "A1", "C5" and so on; however, these examples are merely for exemplary illustration and the application field of the present disclosure is not limited thereto.

The adjustment system of the present disclosure provides the driver to quickly select the display position of the set of reversing reference lines on the reversing image. The touch-controlled display module 21 of the electronic device 20 may display the record names of all pieces of setting data of the set of reversing reference lines stored in the storage module 24 of the electronic device 20, and the driver may select one of the record names displayed on the touch-controlled display module 21 of the electronic device 20.

After the driver selects one of the record names displayed on the touch-controlled display module 21 of the electronic device 20, the query module 25 of the electronic device 20 receives the selected record name from the touch-controlled display module 21 of the electronic device 20, and then searches the display position of the set of reversing reference lines corresponding to the selected record name.

After the query module 25 of the electronic device 20 searches the corresponding display position of the set of reversing reference lines on the reversing image, the instruction generating module 26 of the electronic device 20 generates an adjustment instruction according to the searched corresponding display position of the set of reversing reference lines, and transmits the adjustment instruction to the adjustment module 22 of the electronic device 20 for sequential adjustment of the set of reversing reference lines.

Besides the record name and the display position of the set of reversing reference lines on the reversing image, each piece of setting data of the set of reversing reference lines stored in the storage module 24 of the electronic device 20 further includes the global position coordinate range.

The global positioning module 27 of the electronic device 20 is configured to obtain the global positioning coordinate of the vehicle, and the processing module 28 of the electronic device 20 receives the global positioning coordinate from the global positioning module 27 of the electronic device 20 and determines whether the global positioning coordinate of the vehicle is within one of the global positioning coordinate range according to the global positioning coordinate range of the at least one piece of setting data of the set of reversing reference lines stored in the storage module 24 of the electronic device 20.

After the processing module 28 of the electronic device 20 determines that the global positioning coordinate of the vehicle is within one of the global positioning coordinate range of the at least one piece of setting data of the set of reversing reference lines, the processing module 28 searches the display position of the set of reversing reference lines corresponding to the global positioning coordinate range which the global positioning coordinate of the vehicle is within, and the instruction generating module 26 of the electronic device 20 then generates the adjustment instruction according to the searched display position and transmits the adjustment instruction to the adjustment module 22 of the electronic device 20 for sequential adjustment of the set of reversing reference lines. As a result, the adjustment system of the present disclosure is able to automatically select the position of the set of reversing reference lines displayed on the reversing image meeting the driver's demand according to the global positioning coordinate of the vehicle, thereby.

To summarize, the difference between the adjustment system and method of the present disclosure and the conventional technology is that the adjustment system of the present disclosure is able to adjust the display position of the set of reversing reference lines, the display position of the horizontal reversing reference line, the display position of the front point of the left reversing reference line, the display position of the rear point of the left reversing reference line, the display position of the front point of the right reversing reference line or the display position of the rear point of the right reversing reference line on the reversing image, according to adjustment instruction.

Therefore, the reversing reference line adjustment system of the present disclosure provides the driver to adjust the reversing reference line of the reversing image display system, thereby solving the conventional technology problem of the existing reversing image display system unable to provide the function of adjusting the reversing reference line.

The present disclosure illustrated herein has been described by means of specific embodiments. However, numerous modifications, variations and enhancements can be made thereto by those skilled in the art without departing from the spirit and scope of the invention set forth in the claims.

What is claimed is:

1. A reversing reference line adjustment system for reversing image display, comprising:
   an image device, mounted at the rear of a vehicle, and comprising:
      an image capture module activated to capture a reversing image while the vehicle is reversing; and
      a first wireless transmission module configured to receive the reversing image from the image capture module, and transmit the reversing image by a wireless transmission manner; and
   an electronic device configured to receive the reversing image from the first wireless transmission module, and comprising:
      a touch-controlled display module configured to display the reversing image and a set of reversing reference lines on the reversing image, wherein the set of reversing reference lines comprises a horizontal reversing reference line, a left reversing reference line and a right reversing reference line, and the touch-controlled display module receives an adjustment instruction inputted by a driver; and
      an adjustment module configured to receive the adjustment instruction from the touch-controlled display module and adjust a display position of the set of reversing reference lines, a display position of the horizontal reversing reference line, a display position of a front point of the left reversing reference line, a display position of a rear point of the left reversing reference line, a display position of a front point of the right reversing reference line or a display position of a rear point of the right reversing reference line on the reversing image, according to the adjustment instruction.

2. The reversing reference line adjustment system according to claim 1, wherein the electronic device further comprises a storage module configured to store at least one piece of setting data of the set of reversing reference lines, and each of the at least one piece of setting data of the set of reversing reference lines comprises a record name and a display position of the set of reversing reference lines on the reversing image.

3. The reversing reference line adjustment system according to claim 2, wherein the electronic device further comprises a query module and an instruction generating module, and the touch-controlled display module further displays the record name of the at least piece of the setting data, and when the driver selects one of the record name of the at least piece of the setting data displayed on the touch-controlled display module, the query module receives the selected record name from the touch-controlled display module and searches the display position of the set of reversing reference lines corresponding to the selected record name, and the instruction generating module generates the adjustment instruction according to the searched display position of the set of reversing reference lines on the reversing image, and transmits the adjustment instruction to the adjustment module.

4. The reversing reference line adjustment system according to claim 2, wherein each of the at least one piece of setting data of the set of reversing reference lines further comprises a global positioning coordinate range.

5. The reversing reference line adjustment system according to claim 4, wherein the electronic device further comprises a global positioning module, a processing module, and an instruction generating module, the global positioning module is configured to obtain a global positioning coordinate of the vehicle, and the processing module receives the global positioning coordinate of the vehicle from the global positioning module and determines whether the global positioning coordinate is within one of the global positioning coordinate range of the at least one piece of setting data of the set of reversing reference lines, and when the processing module determines that the global positioning coordinate is within one of the global positioning coordinate range of the at least one piece of setting data of the set of reversing reference lines, the processing module searches the display position of the set of reversing reference lines corresponding to the global positioning coordinate range which the global positioning coordinate of the vehicle is within, and the instruction generating module generates the adjustment instruction according to the searched display position of the set of reversing reference lines on the reversing image, and transmits the adjustment instruction to the adjustment module.

6. A reversing reference line adjustment method for reversing image display, comprising:
   providing an image device which comprises an image capture module and a first wireless transmission module, and mounting the image device at the rear of a vehicle;
   activating the image capture module to obtain a reversing image while the vehicle is reversing;
   receiving, by the first wireless transmission module, the reversing image from the image capture module, and transmitting the reversing image to an electronic device, which comprises a touch-controlled display module and an adjustment module, by a wireless transmission manner;
   displaying the reversing image on the touch-controlled display module, and displaying a set of reversing reference lines, which includes a horizontal reversing reference line, a left reversing reference line and a right reversing reference line, on the reversing image;
   receiving, by the touch-controlled display module, an adjustment instruction inputted by a driver; and
   receiving, by the adjustment module, the adjustment instruction from the touch-controlled display module, and adjusting a display position of the set of reversing reference lines, a display position of the horizontal reversing reference line, a display position of a front point of the left reversing reference line, a display position of a rear point of the left reversing reference line, a display position of a front point of the right reversing reference line or a display position of a rear point of the right reversing reference line on the reversing image, according to the adjustment instruction.

7. The reversing reference line adjustment method according to claim 6, wherein the electronic device further comprises a storage module configured to store at least one piece of setting data of the set of reversing reference lines, and each of the at least one piece of setting data comprises a record name and the display position of the set of reversing reference lines on the reversing image.

8. The reversing reference line adjustment method according to claim 7 wherein the electronic device further comprise a query module and an instruction generating module, and the reversing reference line adjustment method further comprises:
- displaying, by the touch-controlled display module, the record names stored in the storage module;
- after the driver selects one of the record names displayed on the touch-controlled display module, receiving, by the query module, the selected record name from the touch-controlled display module, and searching the display position of the set of reversing reference lines corresponding to the selected record name;
- generating, by the instruction generating module, the adjustment instruction according to the searched display position of the set of reversing reference lines on the reversing image; and
- transmitting the adjustment instruction to the adjustment module.

9. The reversing reference line adjustment method according to claim 7, wherein each piece of setting data of the set of reversing reference lines further comprises a global positioning coordinate range.

10. The reversing reference line adjustment method according to claim 9, wherein the electronic device further comprises a global positioning module, a processing module, and an instruction generating module, and the global positioning module is configured to obtain a global positioning coordinate of the vehicle, and the processing module is configured to receive the global positioning coordinate from the global positioning module and then determine whether the global positioning coordinate is within one of the global positioning coordinate range of the at least one piece of setting data of the set of reversing reference lines;
wherein the reversing reference line adjustment method further comprises:
- when the processing module determines that the global positioning coordinate is within one of the global positioning coordinate range of the at least one piece of setting data of the set of reversing reference lines, searching the display position of the set of reversing reference lines corresponding to the global positioning coordinate range which the global positioning coordinate of the vehicle is within;
- generating, by the instruction generating module, the adjustment instruction according to the searched display position of the set of reversing reference lines on the reversing image; and
- transmitting the adjustment instruction to the adjustment module.

* * * * *